United States Patent
Rønnow et al.

(10) Patent No.: US 12,071,147 B2
(45) Date of Patent: Aug. 27, 2024

(54) VEHICLE OPERATION

(71) Applicant: Nokia Technologies Oy, Espoo (FI)

(72) Inventors: Troels Rønnow, Cambridge (GB); Karina Palyutina, Cambridge (GB); Enrique Martin-Lopez, Cambridge (GB)

(73) Assignee: Nokia Technologies Oy, Espoo (FI)

(*) Notice: Subject to any disclaimer, the term of this patent is extended or adjusted under 35 U.S.C. 154(b) by 57 days.

(21) Appl. No.: 16/613,270

(22) PCT Filed: May 15, 2018

(86) PCT No.: PCT/EP2018/062431
§ 371 (c)(1),
(2) Date: Nov. 13, 2019

(87) PCT Pub. No.: WO2018/210778
PCT Pub. Date: Nov. 22, 2018

(65) Prior Publication Data
US 2020/0139984 A1     May 7, 2020

(30) Foreign Application Priority Data
May 18, 2017  (EP) .................................. 17171622

(51) Int. Cl.
*B60W 50/029*  (2012.01)
*B60W 50/00*   (2006.01)
(Continued)

(52) U.S. Cl.
CPC ...... *B60W 50/029* (2013.01); *B60W 50/0205* (2013.01); *B60W 50/0225* (2013.01);
(Continued)

(58) Field of Classification Search
USPC ............................................... 701/29
See application file for complete search history.

(56) References Cited

U.S. PATENT DOCUMENTS

| 6,401,027 B1 | 6/2002 | Xu et al. |
| 9,224,293 B2 | 12/2015 | Taylor |

(Continued)

FOREIGN PATENT DOCUMENTS

| CN | 105430767 A | 3/2016 |
| CN | 106130779 A | 11/2016 |

(Continued)

OTHER PUBLICATIONS

Leiding et al. "Self-managed and Blockchain-based Vehicular Ad-hoc Networks", Proceedings of the 2016 ACM International Joint Conference on Pervasive and Ubiquitous Computing: Adjunct, Sep. 12-16, 2016, pp. 137-140.

(Continued)

*Primary Examiner* — Jaime Figueroa
*Assistant Examiner* — Jerrod Irvin Davis
(74) *Attorney, Agent, or Firm* — DITTHAVONG, STEINER, & MLOTKOWSKI

(57) ABSTRACT

A technique, comprising: controlling an operation of a first vehicle at least partly on the basis of information about one or more sensor outputs of one or more other vehicles recovered from one or more radio transmissions each verifiable as a radio transmission by a vehicle included in a record of certified vehicles.

19 Claims, 6 Drawing Sheets

(51) Int. Cl.
  *B60W 50/02* (2012.01)
  *G05D 1/00* (2024.01)
  *G08G 1/16* (2006.01)

(52) U.S. Cl.
  CPC ............ *G05D 1/0214* (2013.01); *G08G 1/163* (2013.01); *B60W 2050/0075* (2013.01); *B60W 2050/0215* (2013.01); *B60W 2556/45* (2020.02)

(56) References Cited

U.S. PATENT DOCUMENTS

| | | | |
|---|---|---|---|
| 9,403,482 | B2 | 8/2016 | Shahraray et al. |
| 9,461,827 | B2 | 10/2016 | Laberteaux et al. |
| 9,547,989 | B2 | 1/2017 | Fairfield et al. |
| 9,607,454 | B1 | 3/2017 | Raghu et al. |
| 9,824,589 | B1* | 11/2017 | Ramirez ............... G08G 1/166 |
| 10,062,277 | B2* | 8/2018 | Furuichi .......... G08G 1/096716 |
| 10,713,727 | B1* | 7/2020 | Floyd ...................... G07C 5/008 |
| 2003/0146850 | A1 | 8/2003 | Fallenstein |
| 2009/0179775 | A1 | 7/2009 | Bos |
| 2009/0198440 | A1* | 8/2009 | Shiraki ................... G08G 1/163 |
| | | | 701/117 |
| 2009/0299598 | A1 | 12/2009 | Boecker et al. |
| 2011/0102195 | A1* | 5/2011 | Kushi .............. G08G 1/096783 |
| | | | 340/905 |
| 2012/0010797 | A1 | 1/2012 | Luo et al. |
| 2012/0109505 | A1 | 5/2012 | Cumming |
| 2012/0158820 | A1 | 6/2012 | Bai et al. |
| 2013/0013179 | A1 | 1/2013 | Lection et al. |
| 2013/0083679 | A1* | 4/2013 | Krishnaswamy ...... G08G 1/093 |
| | | | 370/252 |
| 2013/0212659 | A1 | 8/2013 | Maher et al. |
| 2013/0279695 | A1* | 10/2013 | Rubin ................ G01C 21/3822 |
| | | | 380/255 |
| 2013/0304364 | A1* | 11/2013 | Miller .................... G08G 1/163 |
| | | | 701/117 |
| 2013/0304365 | A1* | 11/2013 | Trombley ............... G08G 1/163 |
| | | | 701/117 |
| 2014/0309884 | A1* | 10/2014 | Wolf ....................... B60W 10/18 |
| | | | 701/41 |
| 2016/0248594 | A1 | 8/2016 | Barros et al. |
| 2017/0013047 | A1 | 1/2017 | Hubbard et al. |
| 2017/0026893 | A1* | 1/2017 | Lagassey ............... G07C 5/008 |
| 2017/0041148 | A1 | 2/2017 | Pearce |
| 2017/0046669 | A1 | 2/2017 | Chow et al. |
| 2017/0070778 | A1 | 3/2017 | Zerlan |
| 2018/0040246 | A1* | 2/2018 | Yonemura ............... G08G 1/164 |
| 2018/0122234 | A1* | 5/2018 | Nascimento ......... G08G 1/0133 |
| 2018/0122237 | A1* | 5/2018 | Nascimento ......... G08G 1/0965 |
| 2018/0299284 | A1* | 10/2018 | Wang ................ G01C 21/3694 |
| 2019/0001993 | A1* | 1/2019 | Visintainer ........ B60W 30/0953 |
| 2019/0263404 | A1* | 8/2019 | Bergquist ............ B60W 30/162 |
| 2019/0337510 | A1* | 11/2019 | Song ....................... G06K 9/209 |
| 2021/0042361 | A1* | 2/2021 | Leise ..................... G06Q 10/20 |

FOREIGN PATENT DOCUMENTS

| | | | | |
|---|---|---|---|---|
| CN | 106209777 | A | 12/2016 | |
| EP | 3401891 | A1 * | 11/2018 | ............ G08G 1/163 |
| JP | 2016-143092 | A | 8/2016 | |
| WO | 2014/148976 | A1 | 9/2014 | |
| WO | 2016/048177 | A1 | 3/2016 | |
| WO | 2016/132219 | A1 | 8/2016 | |
| WO | 2016/160593 | A1 | 10/2016 | |
| WO | 2017063524 | A1 | 4/2017 | |
| WO | 2017/194815 | A1 | 11/2017 | |
| WO | 2018/037148 | A1 | 3/2018 | |
| WO | 2018/058441 | A1 | 4/2018 | |
| WO | 2018/073482 | A1 | 4/2018 | |
| WO | 2018/115567 | A1 | 6/2018 | |
| WO | 2018/149505 | A1 | 8/2018 | |
| WO | 2018/162789 | A1 | 9/2018 | |

OTHER PUBLICATIONS

"Fight Traffic Jams with Blockchain Technology", Bitcoin News, Retrieved on Jan. 24, 2017, Webpage available at : https://news.bitcoin.com/fight-traffic-jams-blockchain-technology/.
"The Internet of Cars is Approaching a Crossroads", MIT Technology Review, Retrieved on Nov. 5, 2019, Webpage available at : https://www.technologyreview.com/s/515966/the-internet-of-cars-is-approaching-a-crossroads/.
"Blockchain", Wikipedia, Retrieved on Nov. 5, 2019, Webpage available at : https://en.wikipedia.org/wiki/Blockchain.
"CAR 2 CAR-Communication Consortium_Mission and Objectives", CAR-2-CAR, Retrieved on Nov. 13, 2019, Webpage available at : https://www.car-2-car.org/index.php?id=5.
"Permissionless Vs Permissioned Consensus & Tradeoffs", Credits Vision, Retrieved on Nov. 13, 2019, Webpage available at : http://credits.vision/posts/permissionless-vs-permissioned-consensus-tradeoffs.
Partial European Search Report received for corresponding European Patent Application No. 17171622.8, dated Dec. 5, 2017, 13 pages.
Rowan et al., "Securing Vehicle to Vehicle Communications using Blockchain through Visible Light and Acoustic Side-Channels", arXiv, Apr. 9, 2017, 10 pages.
Extended European Search Report received for corresponding European Patent Application No. 17171622.8, dated Jan. 16, 2018, 13 pages.
International Search Report and Written Opinion received for corresponding Patent Cooperation Treaty Application No. PCT/EP2018/062431, dated Oct. 18, 2018, 25 pages.
Office Action for related Chinese Patent Application No. 201880044259.2. dated Jul. 23, 2021, with English Language Summary, 14 pages.
Office Action for related Chinese Patent Application No. 201880044259.2. dated Feb. 28, 2022, with English Language Summary, 13 pages.
Office Action for related Chinese Application No. 201880044259.2, dated Jun. 29, 2022, with English Language Summary, 8 pages.
Office Action for related European Patent Application No. 17 171 622.8-1213, dated Aug. 2, 2023, 11 pages.
Office Action for related European Patent Application No. 17 171 622.8-1213, dated Feb. 12, 2024, 36 pages.

* cited by examiner

VEHICLE OPERATION

RELATED APPLICATION

This application was originally filed as PCT Application No. PCT/EP2018/062431 filed May 15, 2018 which claims priority benefit from EP Patent Application No. 17171622.8 filed May 18, 2017.

One or more operations of a vehicle may be controlled autonomously (including semi-autonomously) on the basis of outputs of one or more sensors. The inventors for the present application have identified that erroneous sensor outputs (caused e.g. by sensor failures or one or more external interferences) are causing road accidents; and a need for a technique which reduces the risk of such road accidents.

There is hereby provided a method, comprising: controlling an operation of a first vehicle at least partly on the basis of information about one or more sensor outputs of one or more other vehicles recovered from one or more radio transmissions each verifiable as a radio transmission by a vehicle included in a record of certified vehicles.

According to one embodiment, said record of certified vehicles comprises a local copy of a distributed ledger stored in memory at the first vehicle, or a copy of a distributed ledger stored in remote memory accessible by the first vehicle via a communications network.

According to one embodiment, the method further comprises: controlling the addition of one or more new blocks to a blockchain based at least partly on said information about said one or more sensor outputs.

According to one embodiment, the method further comprises: controlling the addition of a new block to the block chain for each radio transmission verifiable as a radio transmission by a vehicle recorded on a distributed ledger.

According to one embodiment, the method further comprises: controlling the addition of a new block to the block chain for a bundle of radio transmissions each verifiable as a radio transmission by a vehicle recorded on a distributed ledger.

According to one embodiment, the method further comprises controlling the addition to a blockchain of one or more new blocks based on information about said one or more sensor outputs of one or more other vehicles recovered from said one or more radio transmissions each verifiable as said radio transmission by said vehicle included in said record of said certified vehicles; and wherein said controlling said operation of said first vehicle comprises identifying from said information about said one or more sensor outputs a consensus between said one or more certified vehicles about one or more external conditions.

According to one embodiment, said consensus between said one or more certified vehicles about one or more external conditions comprises a consensus about how to co-operatively proceed in a traffic system.

There is hereby provided a method, comprising: controlling the radio transmission from a vehicle of data including information about a sensor output, wherein controlling the radio transmission comprises creating a digital signature of at least part of the data using a private key of a private-public key pair whose corresponding public key is included in a record of certified public keys.

According to one embodiment, the record of certified public keys is included in a distributed ledger. There is hereby provided an apparatus comprising: a processor and memory including computer program code, wherein the memory and computer program code are configured to, with the processor, cause the apparatus to: control an operation of a first vehicle at least partly on the basis of information about one or more sensor outputs of one or more other vehicles recovered from one or more radio transmissions each verifiable as a radio transmission by a vehicle included in a record of certified vehicles.

According to one embodiment, said record of certified vehicles comprises a local copy of a distributed ledger stored in memory at the first vehicle, or a copy of a distributed ledger stored in remote memory accessible by the first vehicle via a communications network.

According to one embodiment, the memory and computer program code are further configured to, with the processor, cause the apparatus to: control the addition of one or more new blocks to a blockchain based at least partly on said information about said one or more sensor outputs.

According to one embodiment, the memory and computer program code are further configured to, with the processor, cause the apparatus to: control the addition of a new block to the block chain for each radio transmission verifiable as a radio transmission by a vehicle recorded on a distributed ledger.

According to one embodiment, the memory and computer program code are further configured to, with the processor, cause the apparatus to: control the addition of a new block to the block chain for a bundle of radio transmissions each verifiable as a radio transmission by a vehicle recorded on a distributed ledger.

According to one embodiment, the memory and computer program code are further configured to, with the processor, cause the apparatus to: control the addition to a blockchain of one or more new blocks based on information about said one or more sensor outputs of one or more other vehicles recovered from said one or more radio transmissions each verifiable as said radio transmission by said vehicle included in said record of said certified vehicles; and to identify from said information about said one or more sensor outputs a consensus between said one or more certified vehicles about one or more external conditions.

According to one embodiment, said consensus between said one or more certified vehicles about one or more external conditions comprises a consensus about how to co-operatively proceed in a traffic system.

There is hereby provided an apparatus comprising: a processor and memory including computer program code, wherein the memory and computer program code are configured to, with the processor, cause the apparatus to: control the radio transmission from a vehicle of data including information about a sensor output, and create a digital signature of at least part of the data using a private key of a private-public key pair whose corresponding public key is included in a record of certified public keys.

According to one embodiment, the record of certified public keys is included in a distributed ledger. There is hereby provided an apparatus, comprising: means for controlling an operation of a first vehicle at least partly on the basis of information about one or more sensor outputs of one or more other vehicles recovered from one or more radio transmissions each verifiable as a radio transmission by a vehicle included in a record of certified vehicles.

There is hereby provided an apparatus, comprising: means for controlling the radio transmission from a vehicle of data including information about a sensor output, wherein controlling the radio transmission comprises creating a digital signature of at least part of the data using a private key of a private-public key pair whose corresponding public key is included in a record of certified public keys. There is hereby provided a computer program product comprising program code means which when loaded into a computer controls the computer to: control an operation of a first vehicle at least partly on the basis of information about one or more sensor outputs of one or more other vehicles recovered from one or more radio transmissions each verifiable as a radio transmission by a vehicle included in a record of certified vehicles.

There is hereby provided a computer program product comprising program code means which when loaded into a computer controls the computer to: control the radio transmission from a vehicle of data including information about a sensor output, and to create a digital signature of at least part of the data using a private key of a private-public key pair whose corresponding public key is included in a record of certified public keys.

Embodiments of the invention are described hereunder, by way of example only, with reference to the accompanying drawings in which.

Making an operating decision about how to proceed at a junction served by a traffic control signal is used as an example to describe an example embodiment of the invention, but the same technique is equally applicable to making other kinds of operating decisions.

Figure 1:
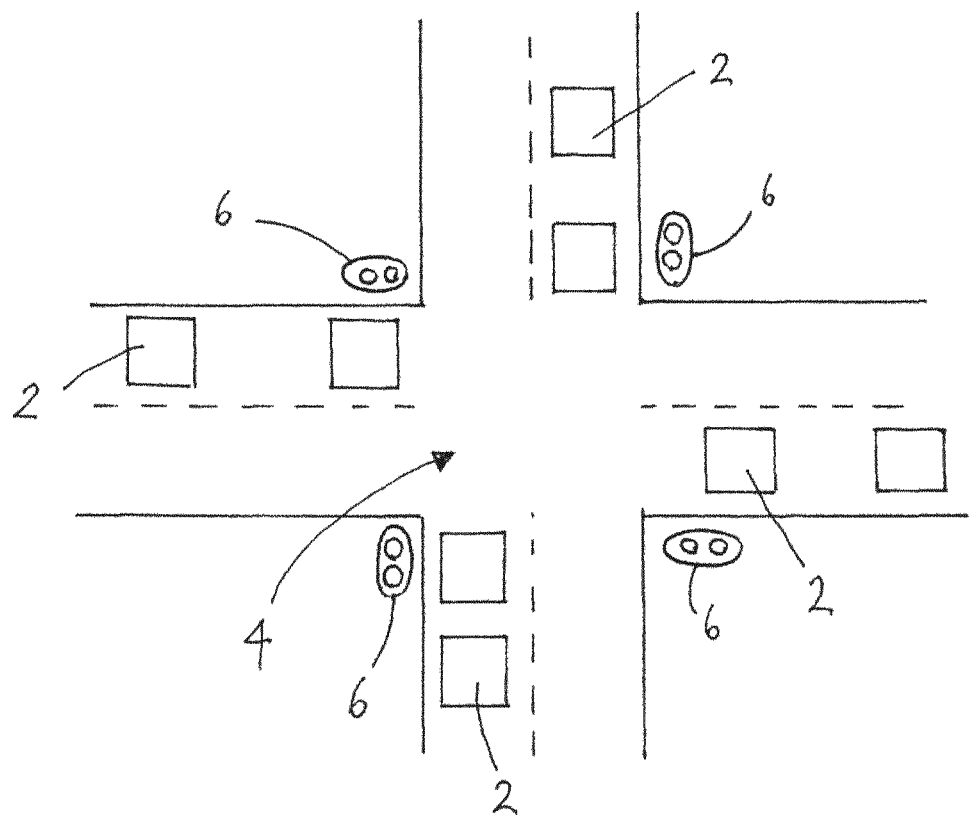
FIG. 1 illustrates an example of a number of vehicles in the vicinity of a visual-based traffic control signal system such as a set of traffic lights.

With reference to FIG. 1, a plurality of vehicles 2, such as autonomous, semi-autonomous, or conventional (i.e. manually operated) vehicles, are operating in the vicinity of a road junction 4 served by a traffic control signal system 6. The traffic control signal system may include visual-based control signal devices such as traffic lights that emit light of different colours, each colour indicating a respective signal such as green for "go" and red for "stop".

Figure 2:
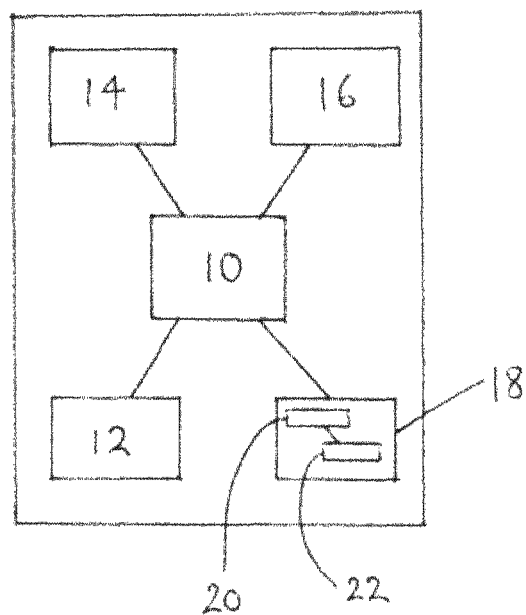
FIG. 2 illustrates an example of apparatus for use in the vehicles of FIG. 1.

FIG. 2 shows a schematic view of an example of apparatus for each vehicle 2. One or more processors 10, operating in accordance with program code stored at one or more memory devices 12, control the operation of one or more actuators 14, whose operation determines the speed and direction of the vehicle, for example breaks, steering, speed control, etc. or any combination thereof. The apparatus also includes one or more sensors 16 whose outputs are saved in memory 12 and may be used as inputs for the one or more processors 10 to control the operation of the actuators 14. For example, the one or more sensors 16 may include one or more video or still image cameras configured to capture visual data about the environment of the vehicle, from which the one or more processors 10 may e.g. make a determination, e.g. an image recognition, about the colour of traffic lights, a type of a traffic sign, or type of an object, such as a vehicle, pedestrian or animal, in the vicinity of the vehicle. Additionally, the one or more sensors 16 may include one or more positioning sensors, such as global navigation satellite system (GNSS) sensors, acceleration sensors, compass sensors, speed sensors, microphones, LIDAR (Light Detection And Ranging) sensors, radar sensors, break sensors, steering angle sensors, any vehicle part specific sensor, or any combination thereof.

The one or more processors 10 also control the generation, transmission, and reception of radio signals via one or more radio transceiver devices 18. A radio transceiver device 18 may comprise a radio-frequency (RF) front end 20 and antenna 22. The RF front end 20 may include one or more analogue and/or digital transceivers, filters, duplexers, and antenna switches. Also, the combination of the radio transceiver 18 and one or more processors 10 also recovers data/information from radio signals reaching the vehicle 2 from e.g. other vehicles. The one or more processors 10 may comprise a baseband processor dedicated to (i) controlling the generation and transmission of radio signals communicating data generated by another one of the processors 10, and (ii) recovering data from radio transmissions received via a radio transceiver device 18, for use by another one of the processors 10. The apparatus may include separate one or more radio transceivers and separate baseband processors for each of a plurality of different radio communication technologies, including e.g. one or more of cellular radio technologies, such as LTE (Long Term Evolution), 4G (4th generation mobile networks) or 5G (5th generation mobile networks), V2V (Vehicle-to-vehicle), V2X (Vehicle-to-everything), Bluetooth, WiFi (Wireless Fidelity), or any combination thereof.

The one or more processors 10 also control the generation, communication and presentation of video and/or audio user interface signals with one or more rendering devices, such as a vehicle infotainment system, a HUD (Head-up Display), a dashboard display, or an external display device, or any combination thereof, in order to render information to a user of the vehicle 2 relating to the control of the vehicle 2.

The one or more processors 10 may be implemented as separate chips or combined into a single chip. The memory 12 may be implemented as one or more chips. The memory 12 may include both read-only memory and random-access memory. The above elements may be provided on one or more circuit boards.

It should be appreciated that the apparatus shown in FIG. 2 described above may comprise further elements which are not directly involved with the embodiments of the invention described hereafter.

Alternatively, FIG. 2 shows a schematic view of an example of a mobile communication device (such as a mobile phone, a tablet computer, a navigation device, a laptop computer, a still/video camera device, or any combination thereof) or an on-board diagnostics (OBD) device, or any combination thereof. The mobile communication device or the OBD device can be wired or wirelessly connected to the system of the vehicle 2, for example mirroring the content of the device to the system, and provide same functionalities as described with the vehicle 2.

All operations described below that are carried out by the one or more processors 10 follow program code stored at memory 12.

Figure 3A:
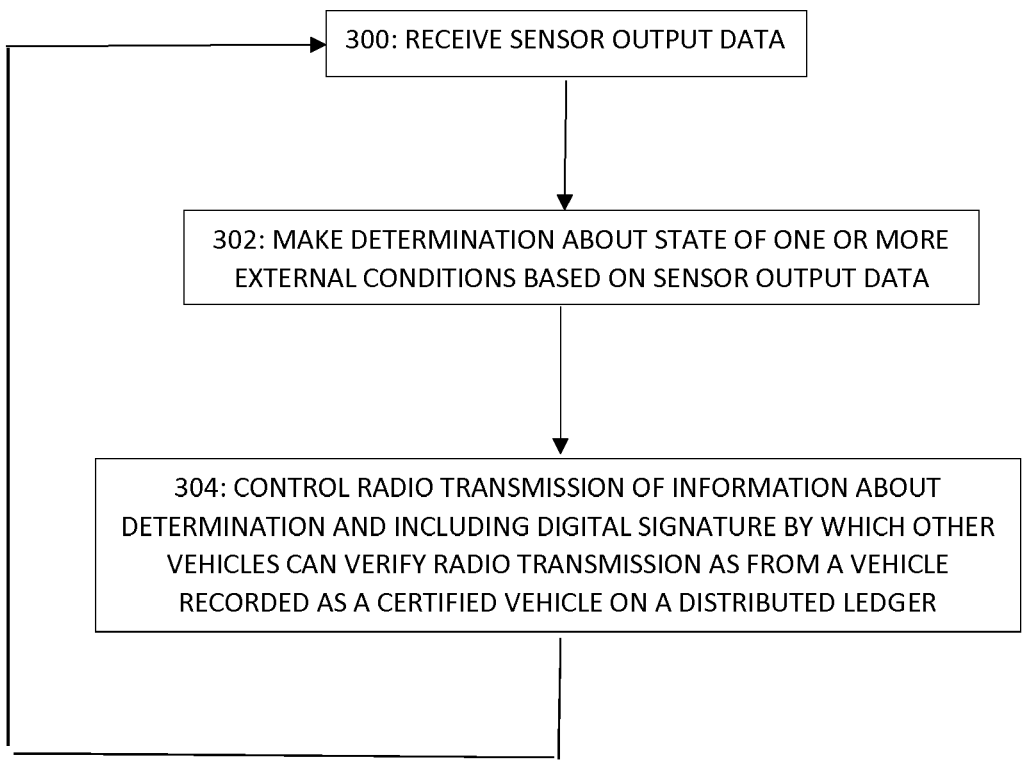
FIG. 3a illustrates an example of a set of operations at the vehicle in FIG. 1.

FIG. 3a illustrates one example of operations at the one or more processors 10 of FIG. 2 according to an example embodiment of the invention.

In response to processor 10 making a determination about the current state of a traffic on a specific location, a system and/or a situation, for example a traffic control signal system, 6 based on the output of one or more sensors 16 (STEPS 300 and 302 of FIG. 3a), the processor controls the storing of the determination result in the memory 12, and additionally controls the transmission of the determination result via the one or more radio transceivers 18 (STEP 304 of FIG. 3a).

For example, the determination result may take the form shown below, which includes: (i) a unique vehicle identifier, such as e.g. a public key of a private-public key pair; (ii) information about one or more observations (determinations) based on sensor outputs, such as e.g. the state of a traffic signal uniquely identified by position coordinates for a road junction uniquely identified by position co-ordinates; and (iii) information about the current position of the vehicle when the observation was made. Additionally, the determination result can comprise one or more unique sensor identifiers for each sensor data that is transmitted, for example identifier for a positioning sensor and/or a camera sensor.

```
{
    car_id: 0xf33908dff....,
    observation: [
        "t cross at approximate (213.3121, 134.1222)"
        "red light at (213.3121, 134.1222)"
    ],
    position: (200.1212, 134.12222)
}
```

As described above, the vehicle 2 has a unique vehicle identifier number which is recorded on a distributed ledger (e.g. blockchain), that is stored in the vehicle 2, as a certified identifier; and the radio transmission is made in a way such that it can be verified as a radio transmission from a vehicle recorded on the distributed ledger as a certified vehicle. For example, the radio transmission may include a digital signature of part or all of the data, e.g. plaintext, communicated by radio transmission using a private key of a private-public key pair for which the public key is recorded on the distributed ledger in association with the vehicle identifier (as mentioned above, the vehicle identifier itself may be the public key). Additionally, or alternatively, the private key of a possibly additional private-public key pair can be used for digitally signing transactions and communications, where the corresponding public key of the pair can act as the vehicle identifier, or be directly related to it. The private key(s) may, for example, be securely incorporated into the processor 10 and/or memory 12 at the time of manufacture.

In one example embodiment, in response to the processor 10 making a determination about the current state of the output of the one or more sensors 16, additionally or alternatively to the determination of the current state of the traffic, (STEPS 300 and 302 of FIG. 3a), the processor controls the storing of the determination result in the memory 12, and additionally controls the transmission of the determination result via the one or more radio transceivers 18 (STEP 304 of FIG. 3a).

Figure 3B:
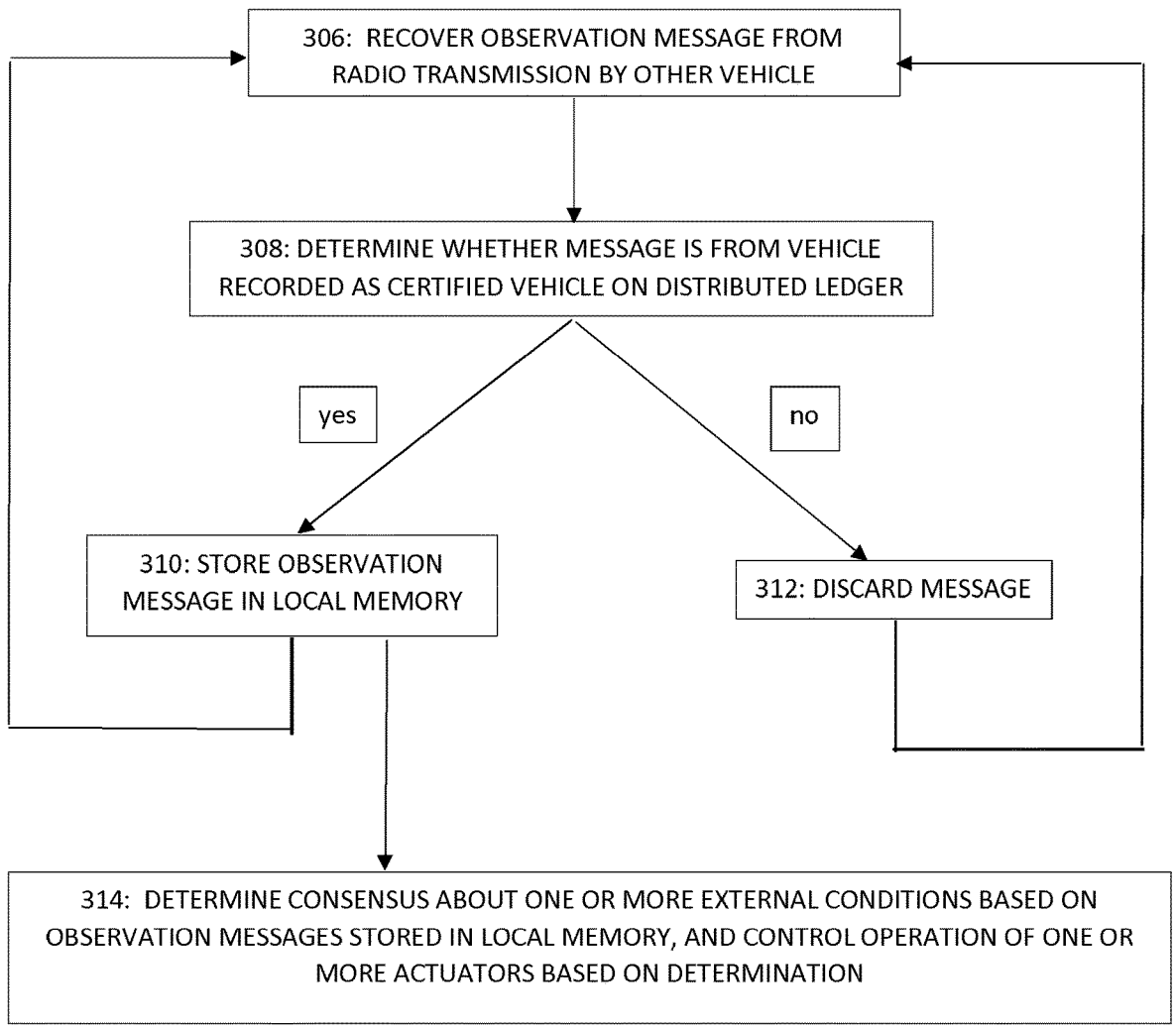
FIG. 3b illustrates another example of a set of operations at the vehicle in FIG. 1.

FIG. 3b illustrates another example of operations at the one or more processors 10 of FIG. 2 for a vehicle 2 in FIG. 1.

In combination with the one or more radio transceivers 18, the one or more processors 10 recover data from one or more radio transmissions made by one or more other vehicles 2 in the vicinity of the road junction 4 (STEP 306 of FIG. 3b). For each data message recovered from the one or more radio transmissions, the processor 10 looks for a vehicle identifier in the message; checks whether the vehicle identifier is an identifier recorded on the distributed ledger that is stored in the other vehicle 2; obtains the public key recorded on the distributed ledger for the vehicle identifier; and checks whether the digital signature is consistent with the plaintext and the public key (STEP 308 of FIG. 3a). If the digital signature is verified, the processor considers the data message as a message from a trusted vehicle, and stores the content of the message in memory 12 (STEP 310 of FIG. 3b). On the other hand, if the digital signature is not consistent with the plaintext and the public key (i.e. the digital signature cannot be verified), the processor discards the message (STEP 312 of FIG. 3b).

According to one option, the local memory 12 may include a local copy of a recent version of the distributed ledger (e.g. updated at the start of the day before commencing any driving operation of the autonomous vehicle 2); and the processor 10 uses this local copy to check whether the vehicle identifier indicated in the message is an identifier recorded on the distributed ledger, and to obtain the public key recorded on the distributed ledger for the vehicle identifier. According to another option, the processor 10 controls the generation and transmission of a message via the one or more transceiver devices 18 requesting this information from a remote memory, such as a distributed ledger, located outside of the vehicles 2 (not shown), via e.g. a radio access network.

In this way, the memory 12 becomes stored with information from a plurality of trusted vehicles in the vicinity of the road junction 4 about the current state of the traffic on a specific location, a system and/or a situation, for example the traffic control signal system 6. From this information stored in the memory 12, the processor 10 determines a consensus about the state of the traffic on the specific location, the system and/or the situation, for example the traffic control signal system 6, and controls the operation of the one or more actuators 14 on the basis of the determined consensus, even if the determined consensus happens not to be consistent with the output of the vehicle's own sensors 16 (STEP 314 of FIG. 3b).

In a scenario in which only certified vehicles are permitted to use the road junction 4, and are each commonly configured to operate according to a consensus about the state of the traffic control signal, it is not even necessary that the consensus agrees with the actual state of the traffic control signal. For example, even if the actual state of the traffic control signal indicates "go" for cars in the north-south directions and "stop" cars in the east-west directions, a vehicle could still proceed safely across the road junction in an east-west direction (i.e. contrary to the actual state of the traffic control signal), if all vehicles using the road junction at the same time follow a consensus that indicates "go" in the east-west directions and "stop" in the north-south directions.

In another example, the autonomous vehicles can operate with the traffic control signal system 6 without any visible traffic lights at the road junction 4 based on the systems described on FIGS. 3a and 3b.

In this scenario, sensors for traditional traffic light and signs could be removed from a road junctions, e.g. the road junction 4, wherein the one or more autonomous vehicles operate co-operatively at e.g. the road junction 4 based on a consensus established between the one or more vehicles and one or more fixed control points. In such a traffic system, the one or more control points do not have to be blockchain nodes—one or more of the control points may be equipped with signal devices configured for local and independent operation without participating in the consensus process.

However, in another embodiment, the one or more control points, such as a crossing, e.g. a road crossing, pedestrian crossing, or railroad crossing, etc., may comprise one or more fixed traffic nodes of their own local blockchains establishing consensus for the one or more approaching vehicles and the one or more control points. These fixed traffic nodes may observe the traffic nearby and emit transactions to the local chain in consequence. In order to improve security in any event of malevolent hacking of fixed traffic nodes, the fixed traffic nodes may also be recorded as certified nodes (e.g. nodes having been certified by a government authority) on the same distributed ledger (or another distributed ledger), so that consensus votes by these fixed traffic nodes can be verified by means of digital signature using public keys recorded on the distributed ledger. These fixed traffic nodes may participate differently to vehicle nodes in the consensus mechanism. For example, a vote by a fixed traffic node may solely determine the consensus for vehicles to follow (irrespective of how many other vehicle nodes may vote differently), or a vote by a fixed traffic node may have greater weight than a vote by a vehicle node, so that more than a majority of vehicle nodes is required to establish a consensus contrary to the vote of a fixed traffic node. More functionality may be incorporated into the fixed traffic nodes such as a capability to mine information into the distributed ledger. The fixed traffic node comprises one or more similar functionalities and elements as the example of the apparatus illustrated in the FIG. 2.

In another example, the same technique described relating to the FIGS. 3a and 3b can be used to establish a consensus between vehicles about the order of arrival at a road junction for which the order or arrival dictates which vehicle has priority.

In another example, in the case of a conventional vehicle (in which a human user fully controls the operation of the vehicle) or a semi-autonomous vehicle (in which a human user monitors partially control of the operation of the vehicle by one or more processors), information about the consensus may be communicated to the user of the vehicle via one or more rendering devices. In case of a fully autonomous vehicle, there may be no need to communicate the consensus to a user of the vehicle; instead one or more processors automatedly control the operation the vehicle, without monitoring or intervention by a user of the vehicle) on the basis of the consensus itself, by controlling the operation of, for example, brakes, steering, speed control, etc. or any combination thereof.

The distributed ledger and the main distributed ledger mentioned above may be a permissioned ledger taking the form of a blockchain, for which the addition of new blocks, for example an output of a sensor, a current state of a traffic, or an established consensus, requires the approval of a predetermined number of legal entities recorded in or more blocks of the blockchain as certifying legal entities. Secure and trusted voting about the addition of new blocks to the blockchain can be achieved e.g. using public-private key pairs, for which the public keys are recorded in one or more existing blocks of the blockchain, and by means of which each legal entity can verify whether a vote is a vote by another legal entity with voting rights.

One example of a certification scheme is a genesis certification scheme, according to which a genesis block of the blockchain identifies the administrators of the blockchain. The genesis block may include a smart contract that specifies that no new administrators may be added. Alternatively, the genesis block may include a smart contract permitting the addition of new administrators and/or the removal of existing administrators subject to one or more conditions, such as the approval of the majority of existing administrators. Again, secure and trusted voting on the addition of new blocks to the blockchain can be achieved e.g. using public-private key pairs, for which the public keys are already recorded in one or more existing blocks of the blockchain, and by which each administrator can verify a vote as a vote by another administrator with voting rights.

Another example of a certification scheme is a hierarchical certification scheme according to which the blockchain specifies a collaboration of government bodies as a top layer of administrators, each with rights to add a new block to the blockchain nominating one or more chosen entities as certification authorities with rights to add vehicles and/or remove vehicles from the record of certified vehicles.

Yet another example of a certification scheme is a user-invite based certification scheme, in which only invited users are allowed to add vehicles to and/or remove vehicles from the record of certified vehicles. For example, vehicle manufacturers may establish a public blockchain where administration rights are kept privately. Each vehicle manufacturer may control one or more private keys that allow them to add vehicles to and/or remove vehicles from the record of certified vehicles. According to one variation, government authorities control private keys whose public keys are recorded in one or more blocks of the block chain as giving rights over any aspect of the administration of the blockchain, and vehicle manufacturers control private keys whose public keys are recorded as keys giving limited rights such as e.g. rights limited to add vehicles to and/or remove vehicles from the record of certified vehicles.

Consensus about the extension of the blockchain may be achieved by using a majority or *Byzantine* fault tolerant consensus mechanism. This consensus mechanism is energy efficient, and ensures that participation in maintaining the blockchain is limited to parties with an interest in the system functioning properly.

Figure 4:
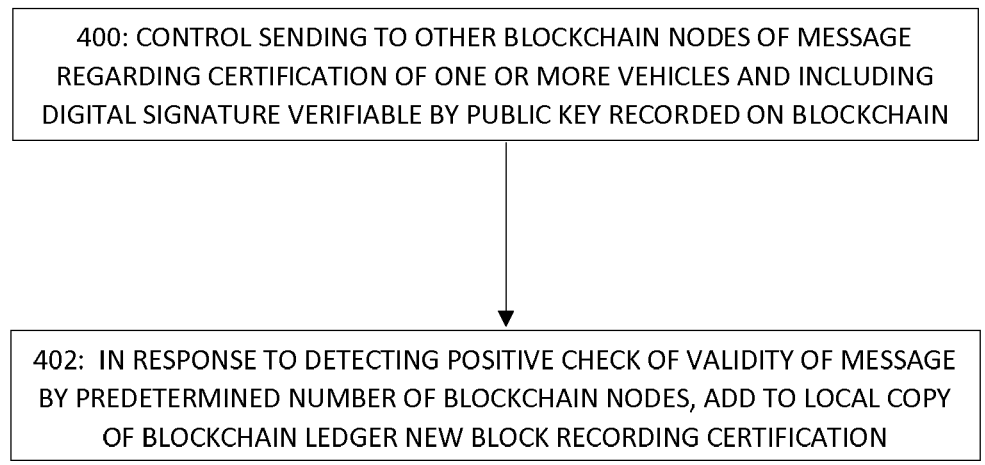
FIG. 4 illustrates an example of a set of node processor operations related to the addition of a vehicle to a record of certified vehicles.

FIG. 4 illustrates a set of operations at a processor of a node, associated with e.g. a car manufacturer, controlling a private key for which the public key counterpart is recorded on the blockchain as giving rights to add vehicles to and/or remove vehicles from the record of certified vehicles. The node processor controls the generation and sending to other certifying nodes in the blockchain network of one or more digitally signed messages publishing one or more transactions involving certifying one or more public keys associated with one or more respective unique vehicle identifiers (STEP 400 of FIG. 4). A digital signature is created from all or part of the plaintext of the message using a private key that is controlled by the node processor and for which the public key counterpart is recorded on the blockchain as being associated with a node having rights to add vehicles to and/or remove vehicles from the record of certified vehicles. Each certifying node receiving the digitally signed message checks the validity of the certification by verifying that the digital signature is consistent with the plaintext of the message and the public key recorded on the blockchain for the identified sender of the message. If the verification is successful, the certification is considered to be valid, and the certifying node sends out a digitally signed message indicating the certification(s) to be valid, and constituting a vote for the certifications to be added to the distributed ledger. When a sufficient number of certifying nodes have validated the certification(s) (i.e. have voted for the certifications to be added to the blockchain) to meet the consensus conditions set out in one or more existing blocks of the blockchain, there is consensus to extend the blockchain by a new block certifying the vehicle identifiers and associated public keys (STEP 402 of FIG. 4).

Figure 5:
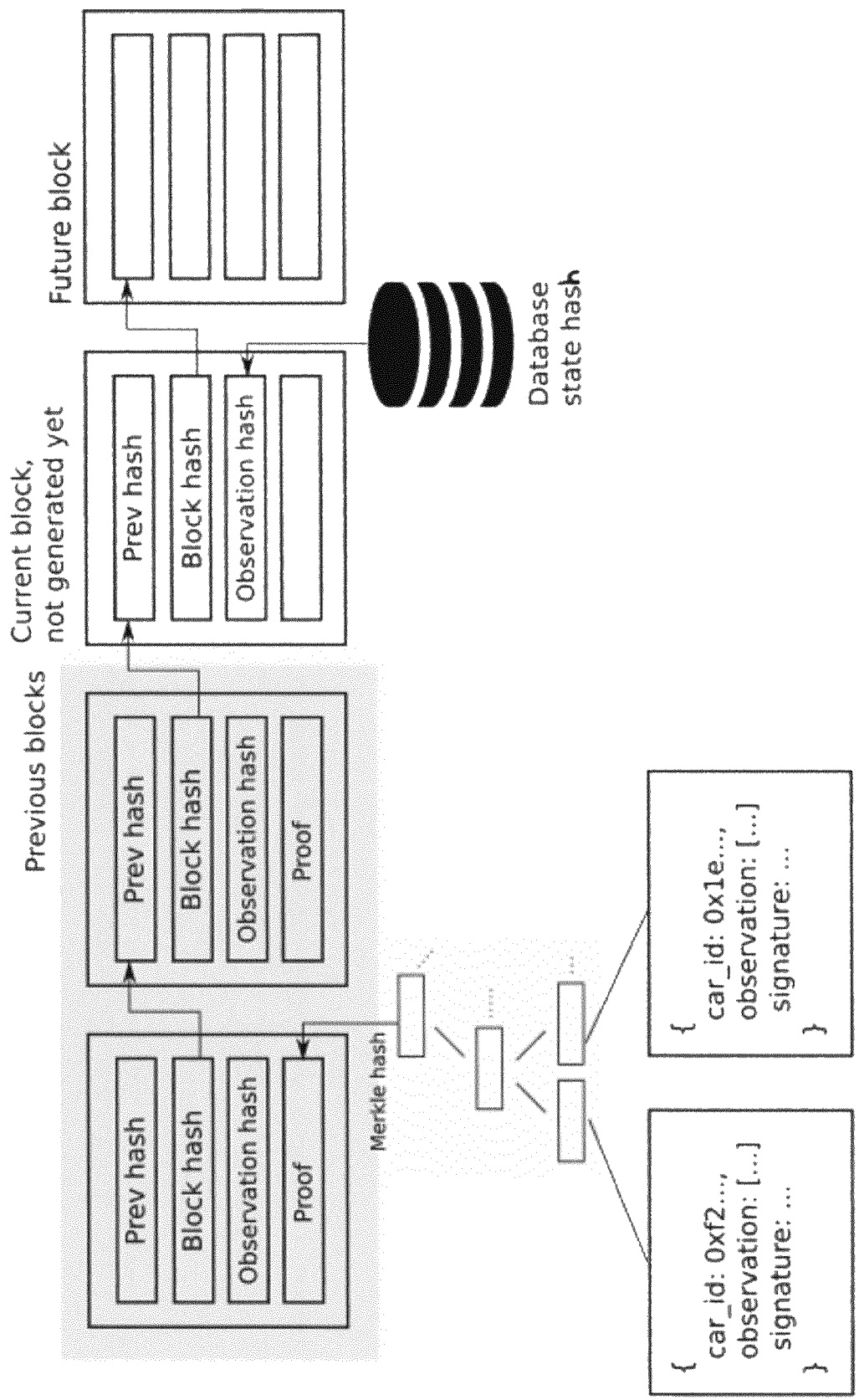
FIG. 5 illustrates the extension of a secondary blockchain record at a vehicle based on sensor output information received from other certified vehicles.

According to one example embodiment, all observations received at a vehicle from trusted vehicles (i.e. all observations in received messages signed with a private key whose public key counterpart is recorded on the distributed ledger) are recorded in a new block of a local blockchain maintained by the processor 10 for the vehicle. One implementation example is illustrated in FIG. 5. The proof-of-majority ("proof" in FIG. 5) consists of a Merkle tree of observations received from other autonomous vehicles. Each observation serves as a consensus vote, and the recordal of the observations in the form of a blockchain with each block linked to the previous one by a one-way function such as a hashing function, later serves as an immutable record of the consensus that determined the operation of the vehicle. The observations may be bundled into blocks based on time stamps. Alternatively, each observation is recorded in a respective block of the blockchain. In FIG. 5, the "observation hash" is a hash of the current state of the local ledger; the hash may, for example, be computed by updating key-value pairs based on the observations found in the "proof" Merkle tree. The method used to update the observation tree may either be predefined in the ledger code itself or done via a smart contract.

Figure 6:
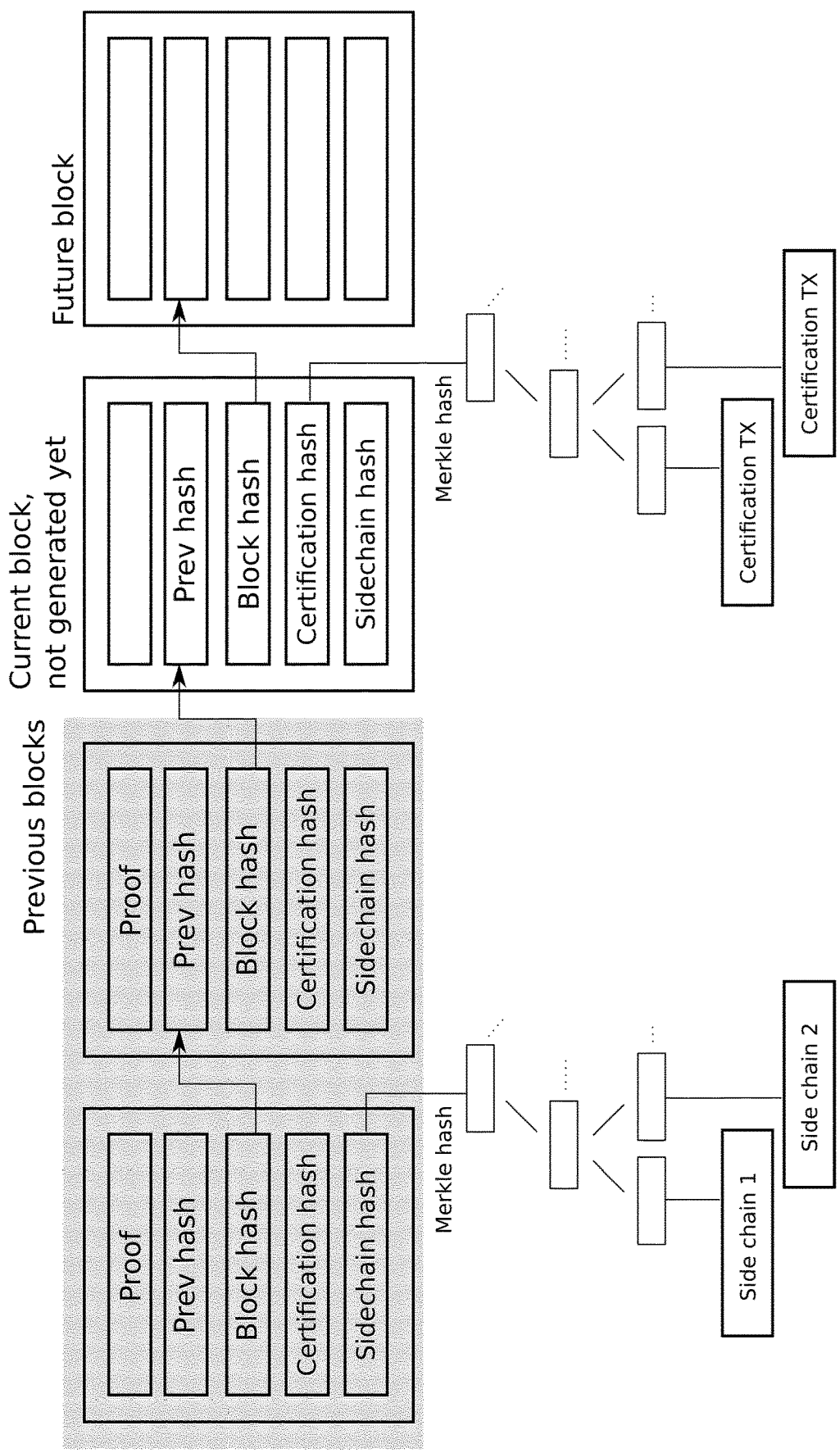
FIG. 6 illustrates the extension of a primary blockchain record based on a secondary blockchain record.

The observation records maintained by each trusted vehicle in the form of individual blockchains may be later linked into the main chain of the distributed ledger that forms the record of public keys for certified vehicles. One implementation example is illustrated in FIG. 6. The main chain of the distributed ledger may include blocks that record a Merkle hash generated from a Merkle tree of individual blockchains (side chains) maintained by a plurality of trusted vehicles. In a different embodiment, blocks from the local blockchains rather than the full chain itself are added to the main chain. FIG. 6 also shows the recordal in the same main chain of the distributed ledger of the above-mentioned certification transactions involving certification of vehicle identifiers and their associated public keys. The "certification hash" is a field of the blocks of the main chain of the distributed ledger, and contains a Merkle hash of all the certification transactions. A different field of the blocks called the "sidechain hash" contains a Merkle hash of all side chains linked into the main chain of the distributed ledger.

Recordal of information (in the form of a blockchain or otherwise) about the observations that determined the operation of a vehicle may be useful for identifying consistently poor sensor systems in autonomous vehicles, for example one or more poor or faulty sensors in a vehicle, and/or one or more poor or faulty vehicles in the system. One or more blocks of the main chain of the distributed ledger may record one or more smart contracts that specify recordal on the blockchain of the removal of certification for any vehicle identifier, and/or any sensor identifier, (and associated public key) for which there the records of observations maintained by each vehicle together indicate poor or faulty sensor performance (e.g. as evidenced by observations that do not agree with the consensus). This can facilitate the removal from the roads of faulty vehicles until if and when they undergo maintenance to remedy the faults evidenced by the observation records.

The combination of (i) the above-mentioned recordal of observations at each trusted vehicle in the form of individual blockchains and (ii) the above-mentioned creation of links between the individual blockchains and the main chain of the distributed ledger makes it effectively impossible for any one vehicle to alter its observation records without detection.

An embodiment of the invention has been described above for the example of establishing a consensus about the state of a traffic signal at a traffic junction. However, the same technique is also applicable, for example, to (a) establish a consensus about which one of a plurality of vehicles at a traffic junction (crossing) has priority to proceed at the traffic junction (crossing), (b) establish a consensus about which one of a plurality of vehicles in a traffic lane is to allow another car outside the lane to join the lane ahead of it (e.g. in order to move between lanes of a multi-lane highway/motorway); (c) establish a consensus about how to interpret other traffic signal or sign; and (d) establish a consensus about reporting a traffic incident or other irregularity, such as a failed sensor.

An autonomous vehicle typically follows a pre-determined route, which may include any number of control points (e.g. traffic lights, crossings, etc.) at each of which a local chain is established amongst the incoming vehicles. This local chain may establish the order in which the vehicles proceed at the control point. The control points may be considered as pauses in operation of the autonomous vehicle along a pre-determined route. At each control point, a blockchain determines when this pause can end and the vehicle can again proceed along the determined route. There is no limit to the rate at which vehicles proceed across a control point; regardless of how many vehicles arrive at the control point in a unit time, the arrival of a vehicle at the control point can be treated as a discrete event, and the above-mentioned consensus protocol can be effective. The consensus blockchain can supplement existing traffic rules. Wherever there is a control point where there is choice about the order in which a plurality of vehicles are to proceed, the decision process can be quickened by negotiating in advance. Regardless of whether the control point is at a location of a traffic light, crossing, etc., each control point is seen by a vehicle as a trigger for a particular driving procedure. For example, the function of a traffic light, or existence of a traffic sign, such as a stop sign or a yield sign, to dictate the operation of a vehicle (i.e. whether to proceed or not) can be simulated in the above-mentioned consensus technique using a blockchain. In the case of the above-mentioned consensus technique, a vehicle also takes into account the consensus (in addition to or instead of its own observation about the state of the traffic light). Hence, the above-mentioned consensus technique using a blockchain resolves potential conflict between two or more vehicles by achieving a consensus about order in which vehicles proceed at a location where cooperation between vehicles is necessary. Some reliance on the vehicle's own sensor output may still be needed. For example, in the event that the vehicle's sensor outputs indicate another vehicle not obeying the established consensus, an autonomous vehicle may decide to take action against the consensus (e.g. to not proceed even though the established consensus indicates priority for the vehicle) in order to avoid an accident. Punishment can be taken against the another vehicle, or the operator of the another vehicle that are observed to not obey the consensus, in order to incentivise the use of the protocol.

Appropriately adapted computer program code product may be used for implementing the various embodiments, when loaded to a computer. The program code product for providing the operation may be stored on and provided by means of a carrier or storage medium such as a carrier disc, card or tape. A possibility is to download the program code product via a data network. Implementation may be provided with appropriate software in a server. Additionally, the carrier or storage medium can be a non-transitory computer-readable storage medium carrying one or more sequences of one or more instructions which, when executed by one or more processors, cause an apparatus or system to at least perform according to the program code product.

Example embodiments of the invention may be practiced separately or in any combinations thereof to provide additional features and/or more complex systems when necessary to ensure adequate solutions for broad and complex problems.

Example embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described example embodiments may be made within the scope of the invention.

The invention claimed is:

1. A method, comprising:
   determining, based on sensor data collected by one or more nodes at a traffic system, a consensus of the nodes about one or more conditions at the traffic system,
   wherein the sensor data, information determined based on the sensor data, or a combination thereof is wirelessly transmitted among the one or more nodes at the traffic system in one or more radio transmissions;
   recovering one or more node identifiers associated with the one or more nodes from the one or more radio transmissions;
   determining a record of certified nodes from a distributed ledger;
   verifying that the one or more radio transmissions are from the one or more nodes that are included in the record of certified nodes by determining that the one or more recovered node identifiers are in the record of certified nodes;
   controlling the one or more nodes as to how to proceed at the traffic system, based, at least in part, on the determined consensus and the determined verifying;
   controlling, by one of the one or more nodes, the one or more radio transmissions of the sensor data, the information determined based on the sensor data, or the combination thereof, among the nodes by creating a digital signature of at least part of the sensor data using a private key corresponding to a public key being included in a record of certified public keys,
   wherein the one or more nodes at the traffic system comprise at least one of the following: one or more vehicles, or one or more fixed traffic nodes.

2. A method according to claim 1, wherein the verifying that the one or more radio transmissions are from the nodes included in the record of certified nodes recorded in the distributed ledger is based on a local copy, a remote copy, or a combination thereof of the distributed ledger, wherein each of the one or more new blocks is respectively added to the blockchain based on the verifying.

3. A method according to claim 1, wherein the one or more new blocks are added to the blockchain in a bundle based on the verifying.

4. A method according to claim 1, further comprising:
   processing the sensor data for image recognition, wherein the one or more external conditions are based on the image recognition,
   wherein a vehicle manufacturer controls a private key of the node with the rights for generating a digital signature of at least one of the nodes in the record of certified nodes.

5. A method according to claim 1, further comprising:
   determining a current traffic state based on the sensor data, wherein the one or more external conditions include the current traffic state, and
   wherein the plurality of vehicles are controlled to autonomously proceed at the traffic system based, at least in part, on the consensus.

6. A method according to claim 5, wherein the current traffic state includes a state of a traffic signal, and the traffic system is adjacent to a road junction.

7. A method according to claim 5, wherein the determining includes:
   a state of the traffic signal identified by position coordinates for a road junction; and current positions of the vehicles.

8. A method according to claim 5, wherein the current traffic state exists at a road junction, and wherein the consensus is an order of arrival at the road junction by the vehicles.

9. A method according to claim 5, further comprising:
   transmitting the determination of the current traffic state among the nodes,
   wherein at least one autonomous operation of the vehicles is based on the consensus that is inconsistent with sensor data of the vehicles.

10. A method according to claim 1, further comprising:
    receiving, at least the portion of the nodes in the record, a message signed with the digital signature of the node with the rights, wherein the message includes a certification of adding the new node, removing the existing node, or a combination thereof;
    validating the certification, at each of the portion of the nodes, by verifying the digital signature of the node with the rights based on the local copy of the distributed ledger using a public key included in a record of certified public keys;
    transmitting, by the portion of the nodes in the record, a digitally signed message indicating the certification as valid;
    when the condition is met, adding to the distributed ledger a new block certifying the public key and a node identifier of the new node, the existing node, or a combination thereof,
    wherein the record of certified public keys, the record of certified nodes, the condition, or a combination thereof is included in the distributed ledger.

11. A method according to claim 1, comprising:
    controlling, by the one of the nodes at the traffic system, an addition of one or more new blocks to a blockchain for the sensor data, the one or more external conditions, the consensus, or a combination thereof in the remote copy of the distributed ledger, the local copy of the distributed ledger, or a combination thereof.

12. The method of claim 1, wherein the record of certified public keys is included in the distributed ledger.

13. The method of claim 1, wherein the one or more fixed traffic nodes comprises one or more control points, such as at least one of a crossing, a road crossing, a pedestrian crossing, a railroad crossing, or a traffic light.

14. An apparatus comprising:
at least one processor, and at least one memory storing instructions that, when executed by the at least one processor, cause the apparatus at least to:
determine, based on sensor data collected by one or more nodes at a traffic system, a consensus of the one or more nodes about one or more conditions at the traffic system,
wherein the sensor data, information determined based on the sensor data, or a combination thereof is wirelessly transmitted among the one or more nodes at the traffic system in one or more radio transmissions;
recover one or more node identifiers associated with the one or more nodes from the one or more radio transmissions;
determine a record of certified nodes from a distributed ledger;
verify that the one or more radio transmissions are from the one or more nodes that are included in the record of certified nodes by determining that the one or more recovered node identifiers are in the record of certified nodes;
control the one or more nodes as to how to proceed at the traffic system, based, at least in part, on the determined consensus and the determined verifying;
control the one or more radio transmissions of the sensor data, the information determined based on the sensor data, or the combination thereof, among the nodes by creating a digital signature of at least part of the sensor data using a private key corresponding to a public key being included in a record of certified public keys,
wherein the one or more nodes at the traffic system comprise at least one of the following: one or more vehicles, or one or more fixed traffic nodes.

15. An apparatus according to claim 14, wherein the verifying that the one or more radio transmissions are from the nodes included in the record of certified nodes recorded in the distributed ledger is based on a local copy, a remote copy, or a combination thereof of the distributed ledger, wherein each of the one or more new blocks is respectively added to the blockchain based on the verifying.

16. An apparatus according to claim 14, wherein the one or more new blocks are added to the blockchain in a bundle based on the verifying.

17. An apparatus according to claim 14, further cause the apparatus to:
control an addition of one or more new blocks to a blockchain for the sensor data, the one or more external conditions, the consensus, or a combination thereof in the remote copy of the distributed ledger, the local copy of the distributed ledger, or a combination thereof.

18. A non-transitory computer-readable storage medium carrying one or more sequences of one or more instructions which, when executed by one or more processors, cause an apparatus embedded in one or more nodes at a traffic system to perform:
determining, based on sensor data collected by the one or more nodes at a traffic system, a consensus of the nodes about one or more conditions at the traffic system,
wherein the sensor data, information determined based on the sensor data, or a combination thereof is wirelessly transmitted among the one or more nodes at the traffic system in one or more radio transmissions;
recovering one or more node identifiers associated with the one or more nodes from the one or more radio transmissions;
determining a record of certified nodes from a distributed ledger;
verifying that the one or more radio transmissions are from the one or more nodes that are included in the record of certified nodes by determining that the one or more recovered node identifiers are in the record of certified nodes;
controlling the one or more nodes as to how to proceed at the traffic system, based, at least in part, on the determined consensus and the determined verifying;
controlling the one or more radio transmissions of the sensor data, the information determined based on the sensor data, or the combination thereof, among the nodes by creating a digital signature of at least part of the sensor data using a private key corresponding to a public key being included in a record of certified public keys,
wherein the one or more nodes at the traffic system comprise at least one of the following: one or more vehicles, or one or more fixed traffic nodes.

19. A non-transitory computer-readable storage medium of claim 18, wherein the apparatus is caused to further perform:
controlling, by the one of the nodes at the traffic system, an addition of one or more new blocks to a blockchain for the sensor data, the one or more external conditions, the consensus, or a combination thereof in the remote copy of the distributed ledger, the local copy of the distributed ledger, or a combination thereof.

* * * * *